April 28, 1964 R. E. BELL 3,130,802
CONDITION RESPONSIVE DEVICES
Filed March 9, 1962 2 Sheets-Sheet 1

INVENTOR.
ROBERT E. BELL
BY
Marshall, Wilson, Click & Yeasting
ATTORNEYS

April 28, 1964 R. E. BELL 3,130,802
CONDITION RESPONSIVE DEVICES
Filed March 9, 1962 2 Sheets-Sheet 2

INVENTOR.
ROBERT E. BELL
ATTORNEYS

United States Patent Office 3,130,802
Patented Apr. 28, 1964

3,130,802
CONDITION RESPONSIVE DEVICES
Robert E. Bell, Toledo, Ohio, assignor to Toledo Scale
Corporation, Toledo, Ohio, a corporation of Ohio
Filed Mar. 9, 1962, Ser. No. 178,740
13 Claims. (Cl. 177—12)

This invention relates to condition responsive devices and particularly to controls for such devices.

It is desirable in condition responsive devices, as typified by weighing scales, to effect certain operations only after a particular set of conditions has been met. Such conditions may be essential to the accurate employment of the devices in the case of a requirement that the relative motion between certain movable and stationary elements decline below a predetermined level before effecting such operations. Also, such operations must be stopped should accidentally applied vibrations cause such relative motion to rise above the predetermined level. A motion detecting control for such condition responsive devices is disclosed in U.S. application Serial No. 173,037 filed February 13, 1962, in the name of R. C. Loshbough in which the disclosure of U.S. application Serial No. 92,233 filed February 28, 1961, in the names of R. E. Bell and D. B. Kendall relating to a computing and printing weighing scale system is incorporated by reference. In such weighing scale system employing such motion detecting control, mechanical overload and zero switches are used and are shown as overload switch SW17 and zero switch SW18 in line 57 of FIG. XXIII in the above application Serial No. 92,233.

The overload switch is used as a protection against weighing overload packages, e.g., if the weighing scale has a capacity of twenty-five pounds, it would be possible, if it were not for the overload switch, to place a package weighing more than twenty-five pounds upon the scale and print a value ticket in which the value is computed on the basis of a package weighing twenty-five pounds. The overload switch immobilizes the system should an overload package be placed upon the scale. The zero switch is used to prevent a cycle of operations after a load is removed from the scale and the motion detector signals that motion of the weighing mechanism has declined below the predetermined level, i.e., if it were not for the zero switch, the automatic weighing system would print a value ticket in which the value is computed on the basis of zero load.

The mechanical overload and zero switches are generally unsatisfactory. The overload switch loaded the weighing mechanism lever affecting weighing before it opened. Accordingly, the overload switch was adjusted to operate beyond full capacity and, hence, afforded no protection at full capacity. The zero switch in particular had to be adjusted to a feather-light condition to avoid a weight indication with no load. Such feather-light condition makes for poor contact reliability. Both of the switches were difficult to adjust because of the precise nature of the adjustments and provided a constant source of trouble in the field requiring frequent service calls. Also, the mechanical switches were independent of the operation of the motion detector and, thus, provided no delay when the scale moved off zero to give the motion detector a chance to get going or to give the scale time to settle back if slight movement off zero was not detected by the motion detector, and provided no control of the weighing scale system in the event of failure of the motion detector. Such delay and control in time of emergency are quite desirable.

Accordingly, the objects of this invention are to improve the apparatus for and the techniques of controlling condition responsive devices, to improve the apparatus for and the techniques of detecting the ends of a capacity range in a measuring apparatus, e.g., detecting the zero and full load positions of a weighing scale, to simplify and to facilitate the adjustment of such apparatus and techniques, to increase the reliability and precision of such apparatus and techniques, and to combine apparatus for and techniques of detecting the ends of a capacity range in automatic condition responsive devices with apparatus for and techniques of detecting motion in such devices, whereby the combination is relatively simple and of low cost, improved overall operating results are obtained, and in emergencies the devices can be operated upon failure of the apparatus for and the techniques of detecting motion.

One embodiment of this invention enabling the realization of these objects is a combination which includes a light source, a movable chart having black opaque areas representing beyond the ends of a capacity range in an automatic computing and printing weighing scale and a transparent area between such opaque areas representing such capacity range, a stationary photoelectric cell, a control circuit and a relay. The black opaque and transparent chart areas are added to a chart like the projection chart disclosed in the above U.S. application Serial No. 173,037 and the relay corresponds to the relay which is disclosed in such application as being controlled by a motion detector, i.e., the relay is controlled both by the motion detector and by the control of the invention. When the weighing scale is at and behind zero capacity and past full capacity, light from the light source directed toward the photocell is interrupted by the black opaque chart areas and when the weighing scale is in between its zero and past full capacity positions light from the light source is directed through the transparent chart area onto the photocell. Signals from the photocell are coupled to the input of an OR circuit which has as a second input the output of the above motion detector. An input to the OR circuit from the control of the invention indicating that the scale is at zero or past full capacity positons, or an input to the OR circuit from the motion detector indicating that the chart is moving rapidly enough that recordings should not be taken causes the OR circuit to produce an output causing the coil of the relay to be energized preventing or interrupting an operating cycle of the automatic computing and printing weighing scale.

In accordance with the above, one feature of this invention resides in the elimination of the prior mechanical overload and zero switches in the computing and printing weighing scale system by substituting the photocell control. This increases the reliability of the control, since the prior feather-light adjusted limit switches have poor contact reliability, facilitates the adjustment of the control, since adjustment of the stationary photocell relative to the opaque and transparent projection chart areas is simple, easy and the adjustment holds, increases the precision of the control, since the control of the invention is non-mechanical, and simplifies the control. The elimination of the prior mechanical overload and zero switches has eliminated one of the greatest sources of trouble in the weighing scale system cutting down significantly the number of service calls.

Another feature involves the use of the optical system including the light source, the projection chart and the detector relay from the motion detector disclosed in the above U.S. application Serial No. 173,037 in the control of the invention. This double use of common parts cuts the cost of the overall control significantly. The opaque and transparent chart areas of the control of the invention are added to the motion detector projection chart which costs no more to make with the added areas than it does without such areas. The motion detector relay is controlled through the OR circuit by signals from the motion detector or from the control of the invention. Hence, the only parts needed in addition to those already in the motion detector to make the control of the invention are the photocell, its immediate circuit, and the OR circuit. Improved operating results are obtained with practically no additional elements.

Still another feature resides in combining the control of the invention with the motion detector. The control provides a delay after the scale moves off zero to give the motion detector a chance to get going or to give the scale time to settle back if slight movement off zero is not detected by the motion detector, and in the event of failure of the motion detector it is possible to operate the automatic computing and printing weighing scale system in the emergency through the control of the invention until a service man arrives. Such delay and control in time of emergency are important features.

The above and other objects and features of this invention will be appreciated more fully from the following detailed description when read with reference to the accompanying drawings wherein.

Figure 1:
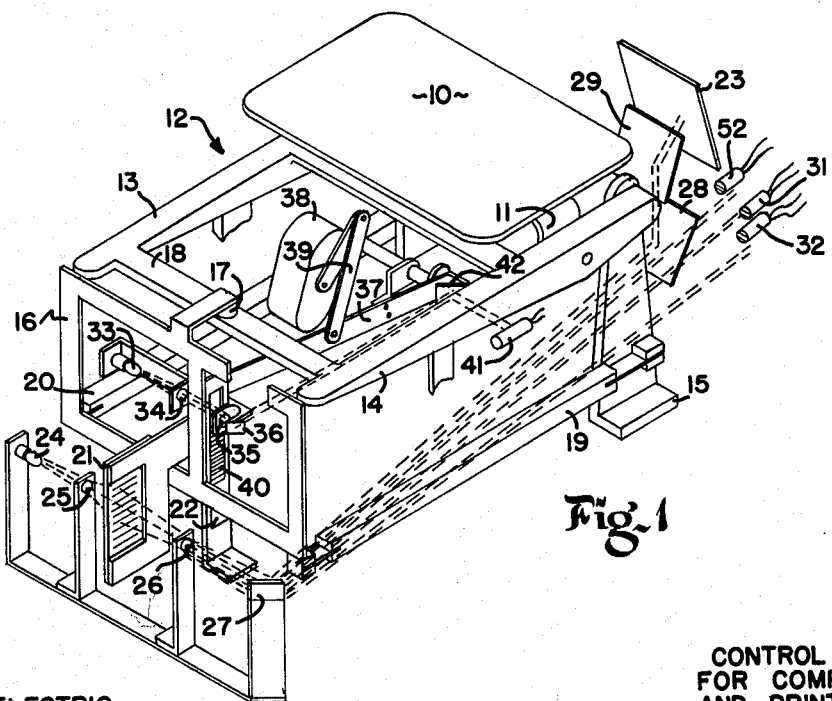
FIG. 1 is a perspective view of a weighing scale embodying the present invention wherein portions of the structure are broken away to better illustrate the details incident to the invention.

Referring to FIG. 1, there is shown a weighing mechanism, part of a motion detector, and part of the control of the invention. A load receiver or platter 10 is carried on a spider 11 that is pivotally mounted on a lever 12 having spaced apart arms 13 and 14. The lever 12 is carried on fulcrum stands 15 of which only one is visible in FIG. 1. A check link, not shown, is employed to keep the load receiver 10 in a level condition at all times. A load counterbalancing spring, not shown, connected between the lever 12 and a rigid support is so arranged that the vertical movement of the free ends of the lever arms 13 and 14 is proportional to the weight of a load placed upon the load receiver 10. A lightweight frame 16, supported on a cone pivot 17 mounted in the center of a cross bar 18 connecting the ends of the lever arms 13 and 14 and guided by check links 19 and 20, serves as a support for a movable projection chart 21 and for a mask 22. The frame 16 is provided with the three point support, i.e., the pivot 17 and the check links 19 and 20, so that it is not subjected to any bending or twisting strains that would tend to distort it and so that it follows the average motion of the lever arms 13 and 14 regardless of the distribution of load upon the load receiver 10.

Figure 2:
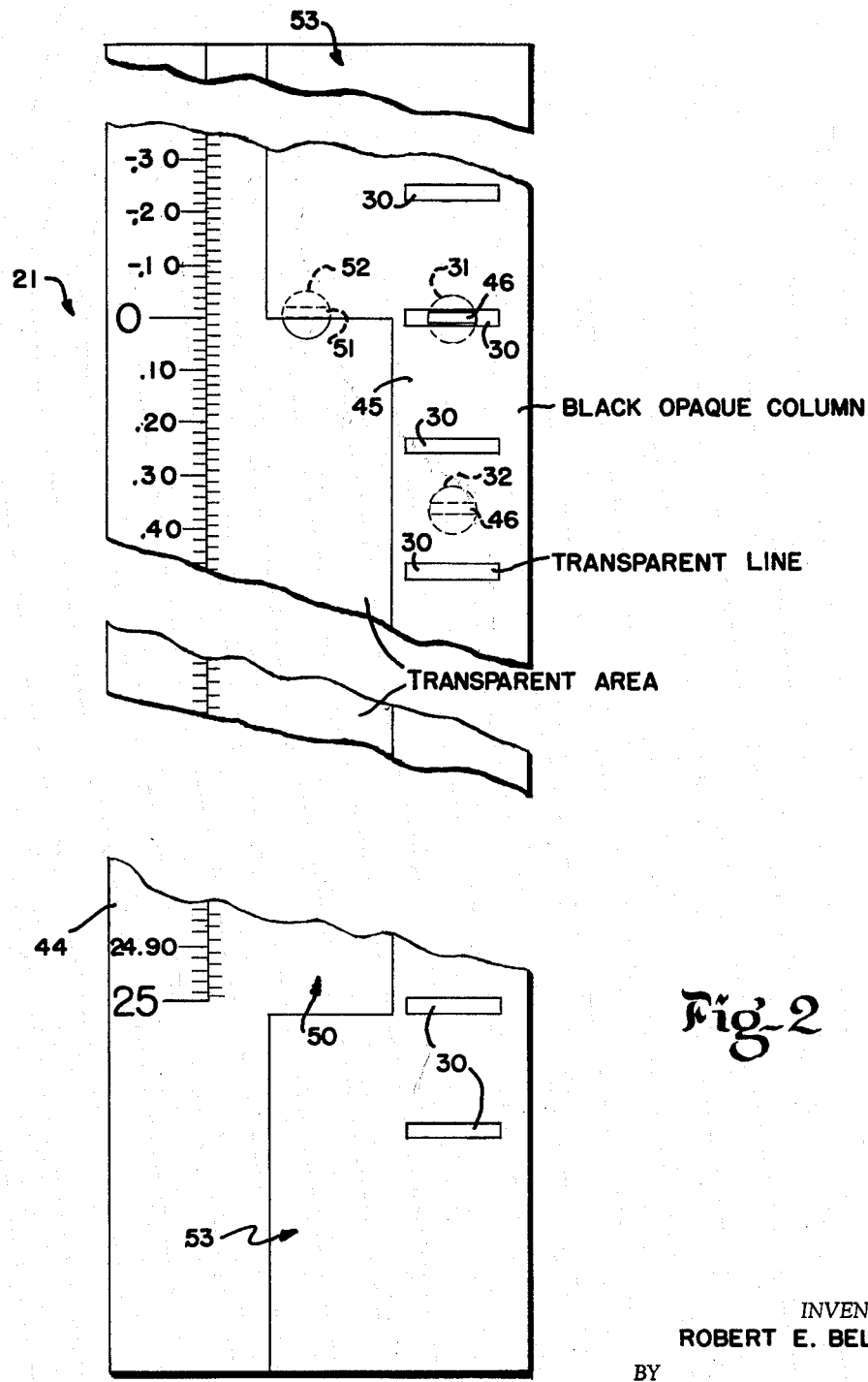
FIG. 2 is a greatly enlarged front elevational view of a projection chart which is shown attached to the weighing scale mechanism in FIG. 1.

Visual indications of the load upon the load receiver 10 are provided by an optical projection system that projects enlarged images of the weight graduations of the projection chart 21 onto a screen 23. The optical projection system includes a light source 24, a condensing lens 25, a projection lens 26, mirrors 27, 28 and 29 and the screen 23. The projection chart 21 is illustrated in FIG. 2 enlarged to forty times actual size which is about the size it is enlarged to by the projection system. In addition to providing the visual projected weight indication on the screen 23, the optical projection system also projects images of the chart lines 30 (FIG. 2) onto two stationary photoelectric cells 31 and 32 (FIGS. 1 and 2) that are parts of electronic equipment which provides a signal indicating relative motion between the indicating mechanism of the scale and the frame of the scale, i.e. a motion detector. The optical projection system and the chart 21 is a means for generating a series of pulses of radiant energy in accordance with relative motion between movable and stationary elements and the photosensitive elements 31 and 32 are translating means for changing the radiant energy pulses to electrical pulses.

The indicating system also includes scanning means for delivering or providing a series of electrical pulses corresponding in number to the weight of the load upon the scale. This scanning means includes a second light source 33 and a condensing lens 34 which together with a projection lens 35 and a mirror 36 are mounted on an oscillating arm 37 that is driven by a motor 38 by means of a crank and connecting rod 39. This movable optical system scans a stationary chart 40 that is variably masked by the mask 22 and projects images of the exposed graduations onto a stationary photoelectric cell 41, the beam of light from the movable mirror 36 being turned at a right angle by a stationary mirror 42 before the beam reaches the photocell 41. Electronic amplifying and counting means, described in the above U.S. application Serial No. 92,233, connected to the photocell 41 give an indication of the weight of the load upon the scale in accordance with the number of images of the exposed graduations that are swept across the photocell 41 by the movement of the movable optical system.

Figure 3:
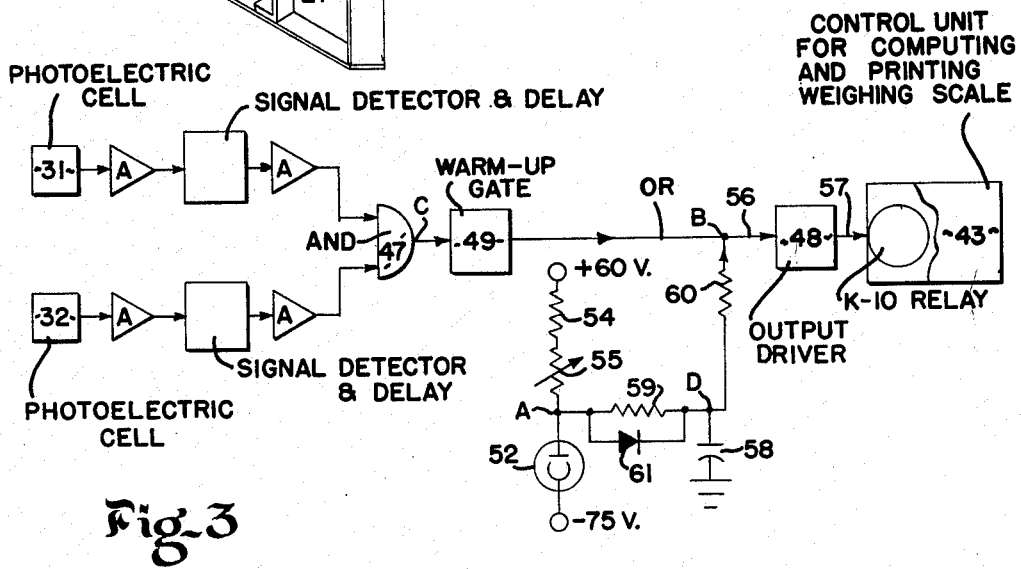
FIG. 3 is a block diagram showing the cooperative relationships between the circuits of this invention.

The weighing mechanism is interlocked to the rest of the system through the motion detector which senses scale motion and operates a relay K-10 (FIG. 3). The relay is held in the operate position during scale motion and is released when there is no motion, provided the weighing mechanism is within its capacity weighing range. This relay provides the basic information necessary to control the scanning means, the computer, and the recording means of the above computing and printing weighing scale system (utilization devices). The motion detector is disclosed in detail in the above U.S. application Serial No. 173,037. Relay K-10 corresponds to motion detector relay K-10 disclosed in such U.S. application and also to relay K10 disclosed in the above U.S. application Serial No. 92,233 and operates relay contacts which correspond to relay contacts K10 shown in FIGS. XXII and XXIII in such application Serial No. 92,233. For the purpose of understanding the usefulness of the control of the invention, it is described as operating the same relay as do the motion detectors disclosed in such pending applications.

The above scanning means, which comprises the movable optical system that scans the stationary chart 40, will not begin to scan when a load is applied to the platter 10 until the weighing mechanism comes to rest, since the scanning means is controlled by relay K-10. This prevents erroneous weight readouts and is accomplished by the motion detector which includes the light source 24, the movable chart 21, the stationary photocells 31 and 32, and part of the circuitry shown in FIG. 3.

When the scale mechanism is in motion caused by change in load upon the platter 10, the projected images of the chart lines 30 on the detector photocells 31 and 32 cause variations in light on the photocells causing the the photocells each to produce an electrical pulse for each variation in light. This output is coupled to the input of the circuitry shown in FIG. 3 which provides the proper voltage to energize relay K-10. As long as the scale mechanism is in motion and the detector photocells 31 and 32 are providing outputs the relay will remain energized and the scanner will not scan. When the scale mechanism comes to rest, the detector photocell outputs drop, the relay is deenergized, and the scanner will scan, provided the weighing mechanism is within its capacity weighing range. The operating cycle of the weighing system including scanning, computing and printing operations is under the control of relay K-10. When the projection chart 21 is moving rapidly enough that recordings should not be taken, such operating cycle cannot be initiated or, if already started, is interrupted. Relay K-10 is mounted in a control unit 43. Control unit 43 corresponds to "Control Unit for Computing and Printing Weighing Scale" shown in FIG. 3 in the above U.S. application Serial No. 173,037.

The projection chart 21, shown enlarged to forty times actual size in FIG. 2, includes a column of weight indicia or graduations 44 and a black opaque column 45 having the series of equally spaced transparent lines or graduations 30 which are spaced relative to the weight indicia approximately one quarter pound apart. The enlarged projection chart 21 may be pictured as the projected chart image part of which, i.e., the weight indicia 44, is projected onto the screen 23 and part of which, i.e., the chart lines 30, is projected onto the sensitive areas of the photocells 31 and 32. The spacing of the stationary photocells 31 and 32 relative to the images of the projected lines 30 is illustrated in FIG. 2, the chart 21 being shown in zero load position. The projected images of the lines 30 are a little wider than the light sensitive areas 46 of the photocells. In so far as has been described, the structure, arrangement and function of the chart is exactly like the structure, arrangement and function of the motion detector projection chart disclosed in the above U.S. application Serial No. 173,037.

If sufficient weight is placed upon the platter 10 so that a projected chart line image passes both of the photocells 31 and 32, an output is seen from an AND circuit 47 and passed on to energize the coil of relay K-10. The relay is held energized for as long as projected chart line images are passing both of the photocells. When the scale comes to rest and no projected chart line images are passing both of the photocells and after a small time delay, the output from the AND circuit diminishes and an output driver 48 allows the relay to be deenergized, provided the weighing mechanism is within its capacity weighing range. The motion detector circuitry shown in block form in FIG. 3 as providing inputs to the AND circuit 47, the output driver 48 and a warm up gate 49 (has no function after initial warm up), together with the control unit 43 including relay K-10, are alike in structure and in function to similarly identified circuits and elements shown in FIG. 3 in the above U.S. application Serial No. 173,037. Point C (FIG. 3) the output of the AND circuit 47 is described hereinafter in connection with the control of the invention as being plus to indicate an output and as being minus to indicate no output from the AND circuit in accordance with the detailed circuit description in the above U.S. application Serial No. 173,037.

The chart 21 has a capacity of twenty-five pounds. If a package weighing more than twenty-five pounds is placed upon the platter 10, the motion detector cannot detect, when it detects the balance point, that the scale is weighing beyond its capacity. Accordingly, means are necessary, as a protection against weighing overload packages, for detecting the past full capacity position and preventing recording under such condition. Also, when load is removed from the platter 10, the motion detector signals at the zero load position of the scale that the scale is at rest and that the scanning, computing and printing cycle should begin. Accordingly, means are necessary for detecting the zero capacity position and preventing the initiation of such cycle under such condition. The control of the invention includes such overload and zero detection means.

As above described, the weighing mechanism is interlocked to the rest of the system through the motion detector which senses scale motion and operates relay K-10. The weighing mechanism also is interlocked to the rest of the system through the control of the invention which senses when the scale is at zero or past full capacity and operates relay K-10.

In addition to providing the visual projected weight indication on the screen 23 and projecting images of the chart lines 30 onto the motion detecting photocells 31 and 32, the optical projection system projects light through a transparent area 50 of the chart 21 onto the sensitive area 51 of a stationary overload and zero limit photocell 52 during certain positions of the chart. The transparent chart area 50 extends as a column between the column of weight indicia 44 and the black opaque motion detector column 45 and extends from zero weight indicia to a point just past the twenty-five pound weight indicia (25.02 pounds), i.e., just past full capacity. The transparent column 50 represents the full capacity range of the weighing scale plus a relatively small increment. The weighing mechanism has zero and full capacity positions, i.e., zero load position and twenty-five pounds load position, respectively, and is movable between under the zero capacity position and past the full capacity position. Beyond the ends of the transparent column 50 are black opaque chart areas 53. In the zero load position of the scale, the projection chart 21 is so positioned by the weighing mechanism that light from the optical system is just prevented from illuminating the sensitive area of the photocell 52 as shown in FIG. 2. One of the features of the control resides in the ease of the adjustment of the photocell 52 relative to the projected chart image so that detection of the zero and overload positions is done precisely, and in the ability of the device to retain its adjustment. The transparent chart area 50 is projected onto the limit photocell 52 for the purpose of determining the zero and overload cutoff points.

When the scale is at zero or behind zero, no light falls upon the limit photocell 52, as illustrated in FIG. 2. The output from this photocell, by means of the circuit connected thereto (FIG. 3), keeps relay K-10 energized and the scanner will not scan (no light on the limit photocell 52). As the scale moves off zero, light from the optical system is directed through the transparent chart area 50 onto the limit photocell 52 causing a change in the photocell output. This change in signal, i.e., the production of a second signal differing from the first signal, as hereinafter described is slightly delayed and then is passed on to deenergize relay K-10. If sufficient weight is placed upon the platter so that one projected chart line 30 passes both of the detector photocells 31 and 32 an output is seen from the AND circuit 47 (point C plus) and is passed on to energize relay K-10. That is, as long as the scale is at zero, relay K-10 remains energized (no light on limit photocell 52) and as the scale moves off zero and for as long as projected chart lines 30 are passing both of the detector photocells 31 and 32, relay K-10 is held energized. When the scale comes to rest and no more projected chart lines 30 are passing the detector photocells 31 and 32, and after a short delay to permit the scale to come to rest the output from the AND circuit drops and, providing the scale is off zero and not over full capacity, relay K-10 is deenergized. Should the scale be overloaded, an instant after it passes full capacity the lower opaque area 53 shown in FIG. 2 cuts off the light from the optical system causing the limit photocell 52 to produce the same output as when the upper opaque area 53 prevented such light from illuminating the sensitive area of the photocell to energize relay K-10. Hence, the output of the limit photocell 52 is such that coupled into the circuit connected thereto (FIG. 3) it holds relay K-10 energized whenever the scale is at or behind zero capacity or beyond full capacity. When the scale is withni its weighing limits, the output of the limit photocell 52 changes and control of relay K-10 is shifted to the AND circuit 47 which operates upon motion of the scale.

The limit photocell 52 is connected to point B of a circuit identified as an "OR" circuit in FIG. 3 which is used to control the output driver 48 and, thus, relay K-10. The OR circuit is a mixing circuit that allows either a signal from the AND circuit 47 or a signal from the limit photocell 52 to operate relay K-10. As long as one or both positive signal outputs are presented to the OR circuit, an output will be coupled into the output driver 48 to prevent the scanning cycle from being initiated (as long as there is scale motion, or if the scale is behind zero or at zero or over full capacity).

The limit photocell 52 is connected between a plus 60 volts source and a negative 75 volts source, a resistor 54 and a range adjusting variable resistor 55 being connected between the positive voltage source and the photocell. The resistors 54 and 55 function to accommodate variations in photocell sensitivities. Point A between the variable resistor 55 and the photocell 52 tends to come to the voltage of the negative or positive source depending on whether or not light is projected upon the photocell. With no light projected through the chart 21 onto the sensitive area of the photocell, such as the case when the scale is at zero or over full capacity, a positive voltage is present at point A. When the scale is between zero and full capacities, light is impressed upon the sensitive area of the photocell 52 and the voltage at point A goes negative. Hence, point A is plus whenever light is prevented from illuminating the limit photocell 52 and is negative during weighing when light is projected through the chart 21 onto the photocell. That is, the photosensitive means generates a first output when the weighing mechanism is in or under the zero capacity position and in the past full capacity position and a second output when the weighing mechanism is between said zero and past full capacity positions.

Point B of the OR circuit is plus when either point C (output of the AND circuit 47) is plus or point A (output of limit photocell 52) is plus. When point B is plus, the coil of relay K-10 is energized and the scanner will not scan. Point B of the OR circuit is minus after a delay when point A becomes minus (scale moves off zero) provided point C becomes minus (scale motion ceases). When point B is minus, the coil of relay K-10 becomes deenergized and the scanner starts. Point B is connected by means of a lead 56 to the control grid of the tube (not shown) of the output driver 48 (shown in detail in the above U.S. application Serial No. 173,037) and the voltage at point B turns such tube off or on in the same manner as does the signal from the AND circuit in such application. That is, the output driver tube disclosed in such application conducts whenever a positive signal from the AND circuit large enough to remain positive after being reduced by 60 volts by means of the neon light 103 is presented to its control grid. Similarly, the tube in output driver 48 conducts whenever a positive signal from the AND circuit 47 (point C plus and, thus, point B plus) is presented to it. Additionally, the tube in the output driver 48 conducts whenever a positive signal from the limit photocell 52 (point A plus and, thus, point B plus) is presented to it. Conduction of the tube in the output driver 48 causes an output on a lead 57. Current flow through the lead 57 is a signal that the chart 21 is moving rapidly enough that recordings should not be taken, or that the scale is at or behind zero capacity position or past full capacity position.

When point A goes negative during weighing, a capacitor 58, connected between ground and a resistor 59 which is connected to point A, is charged through the resistor 59. This creates a time delay. That is, when point A goes minus, the capacitor 58 also goes minus after the delay causing point B to go minus when the capacitor 58 goes minus, point B being connected to the capacitor 58 through a resistor 60. Hence, point B of the OR circuit is minus after a delay when point A becomes minus (scale moves off zero). When point A goes positive with respect to point D which is between the capacitor 58 and the resistor 59, the capacitor 58 is charged quickly through a diode 61 connected between points A and D and bypassing the resistor 59, i.e., the capacitor 58 goes positive with very little delay when point A becomes positive causing point B also to go positive with very little delay when point A becomes positive. This creates a fast operate-slow release limit circuit. That is, when weighing, there is slow detection, but when out of limits (at or behind zero or past full) there is fast detection. Slow detection in limits and fast detection out of limits is a feature of the control as hereinafter described.

One of the features of the control is the elimination of the prior mechanical overload and zero switches in condition responsive devices by substituting the photocell control. This increases the reliability of the control, since the prior feather-light adjusted limit switches have poor contact reliability, facilitates the adjustment of the control, since the adjustment of the limit photocell 52 relative to the opaque and transparent projection chart areas is simple, easy and the adjustment is retained well, increases the precision of the control, and simplifies the control.

Another feature involves the use of the optical system including the light source, the projection chart and the detector relay from the motion detector disclosed in the above U.S. application Serial No. 173,037 in the control of the invention. This double use of common parts cuts the cost of the control significantly. The opaque areas 53 are added to the projection chart in the motion detector which chart costs no more to make with the added opaque areas than it did without such areas. The motion detector relay is controlled through the OR circuit. Hence, the only parts needed in addition to those already in the motion detector to make the control of the invention are the limit photocell 52, its immediate circuit, and the OR circuit.

Still another feature resides in combining the control of the invention with the motion detector. The capacitor 58 provides a delay after the scale moves off zero to give the motion detector a chance to get going or to give the scale time to settle back if slight movement off zero is not detected by the motion detector. That is, at zero point C is minus (no motion) and point A is plus. Hence, point B is plus and the coil of relay K-10 is energized (scanner will not scan). The instant the scale moves off zero during weighing, a point A goes negative and, since, at this instant point C is still negative, point B also would go negative if it were not for the delay which gives the motion detector a chance to get going and make point C positive keeping point B positive while the scale is in motion. Also, the instant the scale moves off zero due to a small vibration which is so small that it is undetected by the motion detector, point A goes negative, and since at this instant point C is negative and will stay that way because the motion is undetected, point B also would go negative if it were not for the delay which gives the scale time to settle back to make point A positive again keeping point B positive so that no scanning cycle will start. The capacitor 58 goes positive with very little delay when point A becomes positive and goes negative after the delay when point A becomes negative as described above. This permits slow detection in limits and fast detection out of limits. When the scale moves off zero, slow detection in limits gives the motion detector a chance to get going or to give the scale time to settle back if slight movement off zero is not detected by the motion detector as described above. However, when the scale moves to zero or behind zero or past full, fast detection out of limits causes point B of the OR circuit to go plus instantly causing in turn the coil of relay K-10 to be energized instantly (recordings cannot be taken).

Combining the control of the invention with the motion detector is useful for another purpose. In the event of failure of the motion detector, it is possible to operate the automatic computing and printing weighing scale system in the emergency by means of the control of the invention until a service man arrives. In the event of failure of the motion detector, the operator must be careful not to put her hands on the weighing mechanism or allow unusual vibrations to be applied to the scale. The delay (0.3–0.5 second) provided by the capacitor 58 after the scale moves off zero is enough to allow the scale to come to a position suitable for the beginning of a scan before relay K-10 is deenergized permitting a scanning cycle to be initiated.

In operation, when there is no load upon the platter 10, the projected image of the chart 21 appears relative to the photocells 31, 32 and 52 as shown in FIG. 2. Since there are no variations in light on the detector photocells 31 and 32, there are no inputs to the AND circuit 47 and, consequently, there is no output from the AND circuit, i.e., point C is minus. Since there is no light on the limit photocell 52, point A is plus. Since point A is plus, point B of the OR circuit is plus and relay K-10 is held energized (scanner will not scan). That is, the OR circuit produces an output to the output driver 48 if it receives a positive input either from the AND circuit (point C plus) or a positive input from the limit photocell 52 (point A plus).

When the scale moves off zero with load upon the platter 10, variations in light on the detector photocells 31 and 32 cause two inputs to be applied to the AND circuit 47 and, consequently, an output from the AND circuit, i.e., point C becomes plus. Since now there is light on the limit photocell 52, point A becomes minus. Since point C is plus, point B of the OR circuit remains plus and relay K-10 is held energized (scanner will not scan). When motion ceases, point C becomes minus and, if the load upon the platter is within the capacity of the scale, point A remains minus. Point B then becomes minus and relay K-10 becomes deenergized (scanner starts its cycle). If the scale passes full capacity, point A becomes plus causing point B to become plus and relay K-10 remains energized (scanner will not scan).

When the scale returns to zero and motion ceases after the load is removed from the scale, point C becomes minus calling for a scan, but point A becomes plus and prevents such scan.

If at any time after the scanning, computing and printing cycle has started, vibrations cause the chart 21 to move rapidly enough that recordings should not be taken, variations in light upon the detector photocells 31 and 32 cause the AND circuit to have an output (point C plus) and the cycle is interrupted.

It is to be understood that the above description is illustrative of this invention and that various modifications thereof can be utilized without departing from its spirit and scope.

Having described the invention, I claim:

1. In a weighing scale system including weighing mechanism having zero and full capacity positions and movable between under said zero capacity position and past said full capacity position and first means responsive to the position of the weighing mechanism, control means comprising, in combination, photosensitive means generating a first output when the weighing mechanism is in or under said zero capacity positions and in said past full capacity position and a second output when the weighing mechanism is between said zero and past full capacity positions, and circuit means responsive to the outputs for prohibiting the operation of the first means in quick response to the presence of said first output and for permitting the operation of the first means in delayed response to the presence of said second output.

2. In a weighing scale system including weighing mechanism having zero and full capacity positions and movable between under said zero capacity position and past said full capacity position, control means comprising, in combination, a relay, photosensitive means generating a first electrical output when the weighing mechanism is in or under said zero capacity positions and in said past full capacity position and a second electrical output when the weighing mechanism is between said zero and past full capacity positions, and means in circuit with the relay and responsive to the electrical outputs for operating the relay in accordance with the electrical outputs, said means in circuit with the relay including a fast operate-slow release limit circuit connected to the output of the photosensitive means providing quick operation of the relay in response to said first electrical output and delayed operation of the relay in response to said second electrical output.

3. In a condition responsive mechanism comprising a movable system of elements having a home position, means for detecting the position of the system relative to being inside or outside a predetermined range including, in combination, a chart mounted to move with the system, a portion of the chart being transparent and corresponding to said predetermined range and portions of the chart being opaque and juxtaposed to the ends of the transparent chart portion, a photosensitive element, illuminating means for illuminating the photosensitive element, the chart being so located between the illuminating means and the photosensitive element that when the movable system is inside said predetermined range the transparent chart portion permits the photosensitive element to be illuminated and when the movable system is outside said predetermined range one or the other of the opaque portions prevents illumination of the photosensitive element, the photosensitive element being so located that when the movable system is in said home position part of one of the opaque chart portions adjacent an end of the transparent chart portion prevents illumination of the photosensitive means, means connected to the photosensitive element enabling the photosensitive element to produce a first electrical output when it is illuminated and a second electrical output when it is not illuminated, and a fast operate-slow release limit circuit means providing a first signal in delayed response to the first output signaling that the movable system is inside said predetermined range and a second signal in quick response to the second output signaling that the movable system is outside said predetermined range.

4. In a computing and printing weighing scale system, in combination, movable weighing mechanism, a chart movable as one with the weighing mechanism, a range graduation on the chart corresponding to a predetermined capacity range, a plurality of motion detecting graduations in spaced positions on the chart, and control means including means cooperating with the range graduation to generate a first electrical output when the weighing mechanism is beyond the ends of the predetermined capacity range and a second electrical output when the weighing mechanism is within said predetermined capacity range, means cooperating with the motion detecting graduations to produce a third electrical output in response to motion of the weighing mechanism above a predetermined level, and means responsive to the electrical outputs signaling the position of the movable weighing mechanism relative to the predetermined capacity range and the motion of the movable weighing mechanism relative to the predetermined level.

5. In a condition responsive mechanism comprising stationary and movable systems of elements, means for detecting the position of the movable system relative to being inside or outside a predetermined capacity range and for detecting motion of the movable system above or below a predetermined level including, in combination, a chart mounted on one of the systems, a range graduation on the chart corresponding to the predetermined range, a plurality of motion detecting graduations in spaced positions on the chart, at least a portion of optical projection means mounted on the other system and arranged to project an image of a portion of the range graduation and a portion of the motion detecting graduations, a stationarily mounted first photosensitive element positioned to receive the image of the range graduation, the first photosensitive element being illuminated by a first level of illumination when the image is projected thereupon and by a second level of illumination when no image is projected thereupon, stationarily mounted second and third photosensitive elements positioned to receive the image of the motion detecting graduations, first circuit means connected to the first photosensitive element enabling the first photosensitive element to produce a first electrical output when it is illuminated by the first level of illumination and a second electrical output when it is illuminated by the second level of illumination, second circuit means connected to the second and third photosensitive elements enabling the second and third photosensitive elements to produce a third electrical output when a projected motion detecting graduation image passes both the second and third photosensitive elements, the first output signaling that the movable system is inside said predetermined range, the second output signaling that the movable system is outside said predetermined range, and the third output signaling that the motion of the movable system is above said predetermined level, and means responsive to the three outputs signaling the position of the movable system relative to the predetermined capacity range and the motion of the movable system relative to the predetermined level.

6. In a condition responsive mechanism having an operating cycle, a stationary system of elements and a movable system of elements having a capacity range, in combination, motion detecting means for initiating said operating cycle in the absence of relative motion between the systems, and photosensitive means for preventing said initiation of said operating cycle when the movable system is outside said range.

7. In a condition responsive mechanism having an operating cycle and a system of elements normally movable in a motion-no-motion cycle within a capacity range, in combination, motion detecting means for initiating said operating cycle after said motion-no-motion cycle, and photosenstive means for preventing said initiation of said operating cycle when the system is outside said capacity range.

8. A computing and printing weighing scale system having an operating cycle including computing and printing operations and weighing mechanism normally movable within a capacity range comprising, in combination, motion detecting means for initiating said operating cycle in the absence of relative motion of the weighing mechanism, and photosensitive means for preventing said initiation of said operating cycle when the weighing mechanism is outside said range.

9. An automatic computing and printing weighing scale system having an operating cycle and weighing mechanism movable inside and outside a range comprising, in combination, motion detecting means for initiating said operating cycle in the absence of relative motion of the weighing mechanism above a predetermined level, photosensitive means generating an electrical output when the weighing mechanism is outside the range, and means responsive to the output for preventing said initiation of said operating cycle.

10. In an automatic weighing scale having a capacity weighing range and an automatic cycle including a motion-no-motion first portion and a second cycle portion, in combination, first means for initiating said second cycle portion at the end of every first cycle portion, and photosensitive means for preventing the initiation of the second cycle portion when weighing outside said range.

11. In an automatic weighing scale having utilization means, a weighing range and motion-no-motion cycles occurring after every change in load upon the scale, in combination, first means rendering the utilization means effective at the end of every motion-no-motion cycle, and photosensitive means for preventing operation of the utilization means when weighing outside said range.

12. In a condition responsive mechanism having an operating cycle, a stationary system of elements and a movable system of elements having a capacity range, in combination, first photosensitive means producing a positive electrical output when there is relative motion between the systems above a predetermined level and producing a negative electrical output when there is no relative motion between the systems, second photosensitive means producing a positive voltage output when the movable system is outside said capacity range and producing a negative voltage output when the movable system is inside said capacity range, and a mixing circuit connected to the outputs of both the photosensitive means for preventing initiation of said operating cycle as long as one or both said positive outputs are present.

13. In a condition responsive mechanism according to claim 12 wherein a fast operate-slow release limit circuit is connected between the second photosensitive means and the mixing circuit for presenting positive voltage outputs to the mixing circuit at a first speed and for presenting negative voltage outputs to the mixing circuit at a second speed which is slow relative to said first speed.

References Cited in the file of this patent
UNITED STATES PATENTS

| 3,044,691 | Allen | July 17, 1962 |
| 3,061,026 | Hecox et al. | Oct. 23, 1962 |